March 10, 1931.  B. L. DUKE  1,795,766
COLLAR FASTENER
Filed Feb. 27, 1930

INVENTOR
*Baxter Lawrence Duke*
BY
ATTORNEYS

Patented Mar. 10, 1931

1,795,766

UNITED STATES PATENT OFFICE

BAXTER LAWRENCE DUKE, OF NEW YORK, N. Y.

COLLAR FASTENER

Application filed February 27, 1930. Serial No. 431,694.

This invention relates to fastening devices especially adapted for use in holding together the front ends of soft collars of the turn down type.

It has been proposed to make such a fastener of a single piece of wire bent to form looped ends from each of which projects an inwardly disposed pin element which is spaced with respect to the body portion of the fastener. Such a fastener is not entirely satisfactory, mainly for the reason that it is awkward in its attachment and detachment with relation to a collar. Another disadvantage of such a device is that there is no means provided to prevent the fabric which is engaged by the pin elements from riding around the looped ends onto the main body portion of the fastener, and producing a very untidy appearance.

One of the objects of the present invention is to provide a fastener for use in connection with soft collars which is provided with manipulating elements so arranged with respect to the fastener as to greatly facilitate its attachment to, and removal from a soft collar and which holds the fastener in place.

In my improved construction I so construct and arrange the manipulating elements, that they form stops which prevent the fabric which is pierced by the pin elements from riding around the looped ends of the fastener onto the body portion thereof, they insure a neat and tidy appearance of the collar at all times, and they facilitate grasping the fastener to insert or remove it.

Reference is had to the accompanying drawings in which

Figure 1:
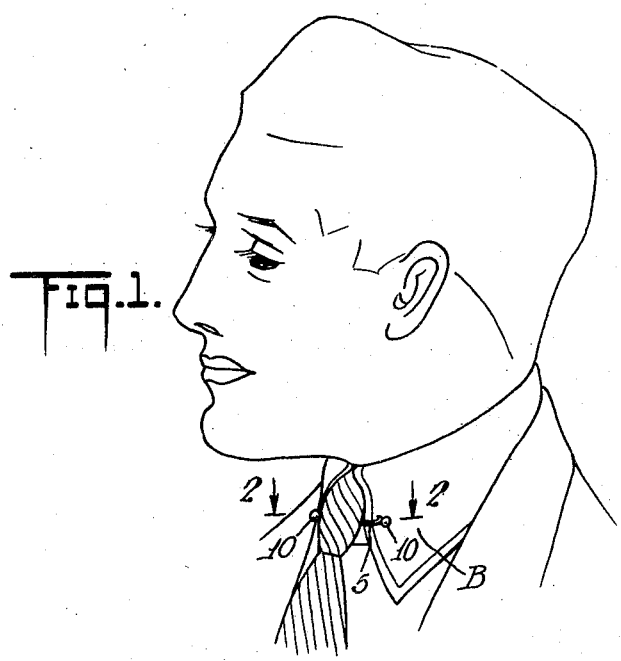
Figure 2:
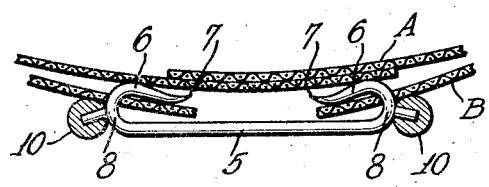

Fig. 1 is a perspective view showing a pin fastener constructed in accordance with the present invention, and its manner of attachment to a soft collar, and Fig. 2 is a sectional view taken on the line 2—2 of Fig. 1.

My improved fastener includes a single piece of wire bent to form a main body portion 5 which is preferably straight and free ends bent backwardly thereon in such a manner as to provide pin elements 6, the extremities of which are sharpened to provide fabric piercing points 7.

Loops 8 connect the ends of the body portion 5, and the pin element 6 and space the latter from the body portion 5 to permit of the free passage of the fabric pierced by the pin elements 6 into the loops 8.

The fastener is positioned upon the collar by passing the pin elements through the spaced ends of the outer or turned down parts or panels B of the collar A with the body portion bridging the space between the ends of the outer parts of the collar. When the fastener is in position, the ends of the outer parts lie in the space between the body portion 5 and the pin elements 6, with those portions of the turned down parts through which the pin elements pass, lying in their repective loop 8.

As the important feature of my novel construction means are provided to prevent the ends of the panels B from riding around the loops 8 onto the body portion 5 of the fastener. These means comprise projections 10 extending outwardly from the loops 8. The projections 10 are preferably ornamental in form and may consist of semi-precious or precious gems which may be mounted in any desired manner upon the outer portions of the loops 8.

When the fastener is in position, the projections 10 engage the outer face of the outer panel of the collar and prevent movement of the ends thereof around the loops 8 onto the body portion of the fastener, thus insuring a neat appearance of the collar at all times. The projections 10 also provide manipulating elements by which the fastener may be grasped and held during its attachment to, and its removal from a collar.

It is important that all of the parts, and particularly the body portion 5, the loops 8, and the projections 10, present smooth curved surfaces free from sharp angles so that there is the minimum wear or chafing of the collar.

Having thus described my invention, what I claim as new and desire to secure by Letters Patent is:

A collar fastener for soft collars of the turn down type, comprising a wire having a main body portion with looped ends presenting pin members extending toward each other in spaced relationship to said body portion, whereby the pin members may penetrate the fabric of the spaced collar ends, and said fabric may lie substantially parallel to the collar band within the loops of the fastener without distortion of said collar ends from their normal planes, and stop members extending in opposite directions from the outermost portions of the loops to permit the fabric to enter the innermost portion of the loop and to prevent the fabric from riding around the looped ends on to the main body portion of the fastener.

Signed at New York, in the county of New York and State of New York, this 25th day of February, A. D. 1930.

BAXTER LAWRENCE DUKE.